Figures 1, 2:
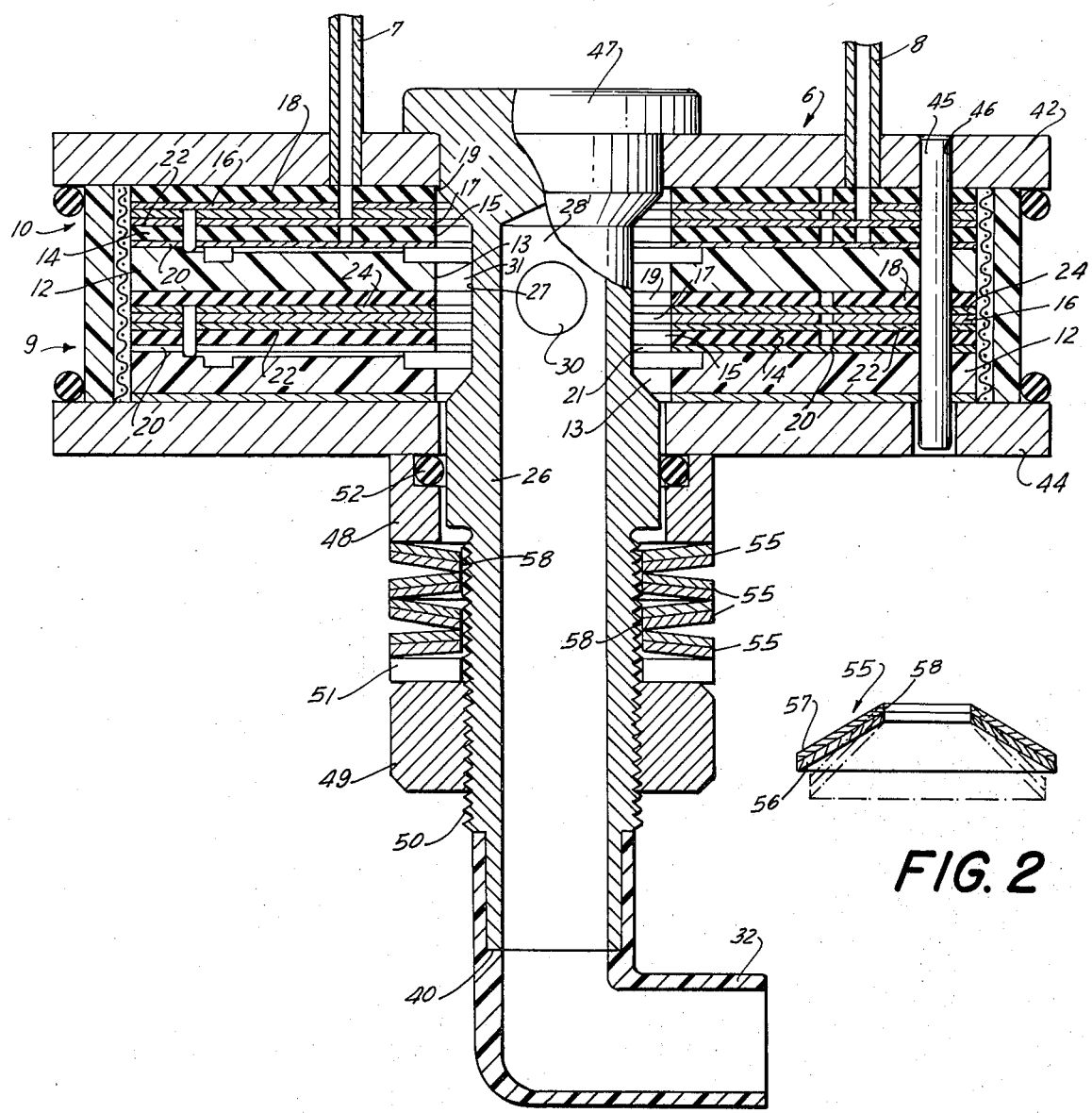

United States Patent [19]
Jansen

[11] 3,815,635
[45] June 11, 1974

[54] TEMPERATURE COMPENSATOR DEVICE AND FLUIDIC ASSEMBLY INCORPORATING IT

[75] Inventor: Theodore J. Jansen, Morristown, N.J.

[73] Assignee: Automatic Switch Company, Florham Park, N.J.

[22] Filed: July 30, 1973

[21] Appl. No.: 383,929

[52] U.S. Cl. ................ 137/833, 85/50 R, 151/38
[51] Int. Cl. .............................................. F15c 1/06
[58] Field of Search ............ 137/80 A, 833; 267/81, 267/82, 83, 118, 119; 151/38; 85/1 R, 50 R

[56] References Cited
UNITED STATES PATENTS

| | | | |
|---|---|---|---|
| 1,295,263 | 2/1919 | Blom | 85/50 R |
| 2,544,664 | 3/1951 | Garner et al. | 85/1 R X |
| 2,936,805 | 5/1960 | Rice | 151/38 |
| 3,587,607 | 6/1971 | Konig et al. | 137/833 |
| 3,653,301 | 4/1972 | Clendenin et al. | 267/119 X |
| 3,712,320 | 1/1973 | Jansen | 137/833 |
| 3,731,700 | 5/1973 | Cohen | 137/833 |

Primary Examiner—William R. Cline
Attorney, Agent, or Firm—Breitenfeld & Levine

[57] ABSTRACT

In a fluidic apparatus, annular body members are stacked between upper and lower plates. The plates and body members provide a centrally located aperture through which a manifold axially extends. The outer contour of the manifold resembles a bolt in that it includes a head and a threaded section. When the apparatus is assembled, the head abuts the upper plate and a nut engaged with the threaded section biases, via a washer and a plurality of bi-metallic washers, a spacer against the lower plate. Each of the bi-metallic washers resembles a truncated hollow cone and the metal on the concave side of the washer has a higher thermal coefficient of expansion than the metal on the convex side. Thus, if after the apparatus is assembled the ambient temperature rises causing the body members to expand, the bi-metallic washers tend to flatten out, thereby reducing pressure variations between the body members. The temperature reaction of the assembled apparatus is reversible and, therefore, the fluidic apparatus is useable over a wide range of temperatures.

7 Claims, 2 Drawing Figures

TEMPERATURE COMPENSATOR DEVICE AND FLUIDIC ASSEMBLY INCORPORATING IT

This invention relates to temperature compensating devices useful for maintaining a substantially constant sealing pressure between assembled layers of dissimilar materials during changes in ambient temperature. The invention has particular utility in connection with fluidic modules.

Fluidic integrated circuit arrangements, comprising stacked layers of plastic flow disks, metal circuit disks, rubber gaskets, and plastic end plates are known. Usually, the stacked layers are pressed together by a bolt and nut assembly. If the sealing pressure provided between the parts of the assembly is insufficient when the fluidic circuits are put to use the stack leaks and the circuits do not operate properly. Alternatively, if the pressure provided is excessive, the circuit geometry is distorted and, again, the fluidic circuits malfunction. To eliminate the problems caused by insufficient or excessive sealing pressure, the bolt and nut of the assembly are put together with the aid of a torque wrench. While this provides a solution when the fluidic circuits are operated over a limited temperature range, over large variations in ambient temperature the different coefficients of thermal expansion of the various parts becomes significant and expansion or contraction of the assembled parts creates thermal forces which adversely affect the sealing pressure, and the circuits malfunction.

It is an object of the present invention to provide a device for relieving thermal stresses in a mechanical assembly made up of components having different coefficients of thermal expansion.

It is another object of the present invention to provide a device for stabilizing the affects of ambient temperature variations on fluidic devices having stacked component parts.

It is still another object of the present invention to provide fluidic devices, having stacked components, which are operative over a wide range of ambient temperatures.

Briefly, the invention calls for fluidic circuit apparatus of the type having stacked component body members, an aperture extending through the stack of body members, and means for holding the stack together. The means for holding the stack together include a clamp member extending through the aperture, said member carrying an abutment; at least one non-flat bi-metallic member slidably mounted on the clamp member; and locking means movably coupled to the clamp member; the locking means being movable toward the abutment carried by the clamp for applying a compressive force to the bi-metallic member and said stack. With this arrangement, when the ambient temperature about the fluidic circuit apparatus changes, the bi-metallic member tends to flatten out or become more non-flat, depending on whether the ambient temperature increases or decreases. As a result, thermal stresses set up between the stacked body layers by the temperature changes are relieved, thereby tending to maintain a constant pressure between the stacked body layers.

The above mentioned and other objects and features of this invention will become apparent by reference to the following description and to the accompanying drawings, wherein:

FIG. 1 is a cross-sectional view of a fluidic device having a number of bi-metallic washers, according to the invention; and FIG. 2 is a cross-sectional view of a bi-metallic washer, shown at one temperature in solid lines and at a lower temperature in dotted lines.

An embodiment chosen to illustrate the invention includes a fluidic assembly such as is fully disclosed in U.S. Pat. No. 3,712,320, issued Jan. 23, 1973. As set forth in the patent and partially in FIG. 1, the fluidic assembly includes an annular shaped body 6 comprising a plurality of annular shaped body members defining a plurality of fluidic devices. Typically, the fluidic devices respond to a control gas supplied via a tube 7, and a gas from a source (not shown) connected by elbow 32. Gas is exhausted via tube 8.

In this assembly, a two-tier body is shown, each tier, 9 and 10, respectively, defining a separate array of symetrically positioned fluidic devices. Each tier comprises a polystyrene circular flow disk 12 having an centrally located aperture 13; a Buna rubber gasket body 14 having an aperture 15 located in the center thereof; a beryllium copper alloy disk 16 having an aperture 17 located in the center thereof; and a Buna rubber gasket body 18 having a centrally located aperture 19. Although not shown, the flow disk 12 and the circuit disk 16 include a plurality of apertures and transversely extending grooves which define desired flow paths for the fluidic devices. In order to inhibit the relatively soft material of gaskets 14 and 18 from deforming into and obstructing these apertures and grooves, there is sandwiched between the flow disk 12 and gasket 14, a circular plastic disk 20 formed, for example, of Mylar and having a centrally located circular aperture 21. Similar Mylar disks 22 and 24 are sandwiched between the circuit disk 16 and the gasket 14 and between gasket 18 and the circuit disk 16, respectively.

The body members are positioned about an elongated, annular manifold body 26 which provides a means for conveying a gas from a supply source, not shown, to the fluidic devices of the apparatus. The manifold body 26 includes a segment 27 of reduced outside diameter, a centrally located bore 28, and an aperture 30 extending transversely through a wall of the bore. The aperture 30 communicates with an enclosed volume 31 formed by the segment 27 and the body members. Operatively, a stream of supply gas flows to the space 31 through an enclosed path defined by a plastic elbow 32, the bore 28 and the aperture 30. A press fit is provided between the elbow 32 and body 26.

The assembly also includes means for securing the body members in alignment and for mounting the body members on the manifold body 26. These means include upper end plate 42 and lower end plate 44, which are circular shaped and have centrally located apertures. Indexing pins 45 (only one shown) extend through alignment apertures 46, formed in the body members, and through apertures formed in the upper and lower plates in order to provide alignment of the various members of the assembly. These apertures are, preferably, asymetrically positioned about the manifold body in order to prevent improper assembly of the body members. The upper plate 42 engages an abutment, in this case a shoulder 47 formed in the manifold body 26. According to the invention, the parts are held together by an arrangement comprising a movable locking means, e.g., a nut 49 engaging an exterior thread surface 50 of the manifold; a flat washer 51; a plurality of bi-metallic washers 55, an o-ring gasket 52, and a spacer body 48. The bi-metallic washers have a centrally located circular hole 58 and, as shown in FIGS. 1 and 2, resemble truncated hollow cones, the concave side 56 of the washer being made from a material having a higher thermal coefficient of expansion than the convex side 57. It will be appreciated that the object of the circular hole 58 is to center the washer on the manifold and that holes having other shapes may be used. As shown in FIG. 1, the washers are positioned such that alternative washers are parallel and adjacent washers have mirror symmetry with respect to an imaginary plane passing between them. This arrangement of washers is compressable, resilient and capable of transmitting balanced or evenly distributed axial forces between the flat washer 51 and spacer body 48. Flat washer 51 is located between one of the bi-metallic washers 55 and nut 49, and when the nut 49 is moved toward the bottom plate 44 spacer body 48 and o-ring gasket 52 provide a leak proof seal between the manifold body 26 and lower plate 44. From the foregoing it should be noted that the manifold functions as a clamping member. To prevent fluid leaks between the body members or distortion of the fluidic circuits provided by the body members, due to excessive compression of the members, when the arrangement is assembled a predetermined amount of force is applied to the lock nut 49 with a torque wrench.

With the arrangement described, when the fluidic assembly is subjected to, for example, an ambient temperature decrease, the body members, which it will be recalled are formed of Buna rubber, Mylar, plastic, etc., contract in accordance with their respective thermal coefficients of expansion and the bi-metallic washers 55 deflect, as shown in FIG. 2, from the sold line position to the dotted line position. Thus, a temperature decrease increases the effective thickness i.e., the overall axial length, of each of the washers, thereby moving spacer body 48 towards the body members and maintaining the nominal pressure therebetween. On the other hand, with ambient temperature increases, the body members tend to expand and the axial length of the bi-metallic washers decreases, thereby preventing the pressure between the body members from increasing. Thus, thermal stresses which would otherwise adversely affect the pressure exerted on the body members are eliminated or reduced through the use of bi-metallic washers 55. As a result, the useful temperature range of the fluidic apparatus is extended.

Referring to FIG. 1, in this example four bi-metallic washers 55 are used to compensate for the expansion or contraction of the body members with ambient temperature increases or decreases, respectively. However, it should be noted that for washers made from particular metals or alloys, e.g., nickel and iron for the low coefficient layer and nickel chromium steel for the high coefficient layer, the number of bi-metallic washers required is dependent upon the number of body members in a particular fluidic apparatus and the thermal coefficients of the members. Moreover, it should be noted that since the stack of body members in this example has a circular shape, the bi-metallic washers are conical so as to provide for even distribution of pressure. However, rectangular bi-metallic strips having an arcuate shape and a centrally located hole could be substituted for the washer arrangement described and shown, where a square or rectangular stack is employed. In general, the shape of the bi-metallic element should be such that an imaginary plane perpendicular to the axis of the hole 58 passes through at least two points on the periphery of the element which are equally spaced from the axis of the hole. In the case of each washer 55, every point on the periphery is arranged in such a plane and is equally spaced from the axis of the hole.

From the foregoing, it may be seen that the bi-metallic washers would be useful in other fastening arrangements wherein it is desired to compensate for thermal stress between parts being held together under pressure. Accordingly, it is to be understood that the description herein of a preferred embodiment according to the invention is set forth as an example thereof, and is not to be construed or interpreted as a limitation on the claims which follow and define the invention.

What is claimed is:

1. A fluidic circuit apparatus comprising:
   a. a stack of component body members, at least some of said members increasing and decreasing in thickness with increases and decreases, respectively, of the ambient temperature,
   b. means for locking said body members together, and
   c. temprature compensator means arranged between said locking means and said stack, said temperature compensator means including an element whose effective thickness decreases and increases with increases and decreases, respectively, of the ambient temperature,
   whereby when the ambient temperature changes, the effective thickness of said temperature compensator element changes in a manner opposite to the change in thickness of said body members so as to maintain the pressure between the stacked body members substantially constant.

2. A fluidic circuit apparatus as defined in claim 1 wherein said temperature compensator element is non-flat, and said element tends to flatten out or become more non-flat with increases and decreases, respectively, of temperature.

3. A fluidic circuit apparatus as defined in claim 2 wherein said temperature compensator means includes a plurality of said elements, said elements being arranged in alignment with each two adjacent elements being arranged in mirror-image relationship.

4. A fluidic circuit apparatus as defined in claim 1 wherein said temperature compensator element is a bi-metallic member.

5. A fluidic circuit apparatus as defined in claim 1 wherein said body members and temperature compensator element have the same peripheral shape.

6. A fluidic circuit apparatus as defined in claim 1 wherein said body members are circular disks, and said temperature compensator element is a frusto-conical washer.

7. A fluidic circuit apparatus as defined in claim 1 including aligned apertures in said body members, a clamp member extending through said aligned apertures, said member carrying an abutment, said temperature compensator element slidably arranged on said clamp member, and locking means coupled to said clamp member and movable with respect thereto toward and away from said abutment for applying a compressive force to said stack of body members and said temperature compensator element.

* * * * *